(12) United States Patent
Suzuki et al.

(10) Patent No.: US 11,080,829 B2
(45) Date of Patent: Aug. 3, 2021

(54) CONTROL APPARATUS AND CONTROL METHOD

(71) Applicant: CANON KABUSHIKI KAISHA, Tokyo (JP)

(72) Inventors: Yasuo Suzuki, Yokohama (JP); Takeshi Ikeda, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 16/732,492

(22) Filed: Jan. 2, 2020

(65) Prior Publication Data

US 2020/0250800 A1 Aug. 6, 2020

(30) Foreign Application Priority Data

Feb. 1, 2019 (JP) .............................. JP2019-016809

(51) Int. Cl.
*G09G 5/00* (2006.01)
*G09G 5/10* (2006.01)
*G06T 5/00* (2006.01)

(52) U.S. Cl.
CPC .............. *G06T 5/009* (2013.01); *G09G 5/10* (2013.01); *G06T 2200/24* (2013.01); *G09G 2320/0238* (2013.01); *G09G 2320/0646* (2013.01); *G09G 2320/0686* (2013.01)

(58) Field of Classification Search
None
See application file for complete search history.

(56) References Cited

U.S. PATENT DOCUMENTS

| | | |
|---|---|---|
| 6,879,372 B1 | 4/2005 | Takaragi et al. |
| 6,975,337 B2 | 12/2005 | Yokoyama et al. |
| 10,565,913 B2 | 2/2020 | Nagashima |
| 2005/0206851 A1 | 9/2005 | Yokoyama et al. |
| 2008/0242988 A1* | 10/2008 | Yoshida ................. A61B 8/481 600/443 |
| 2015/0109243 A1* | 4/2015 | Jun ...................... G06F 3/04886 345/174 |
| 2016/0275913 A1 | 9/2016 | Nagashima |
| 2017/0018105 A1* | 1/2017 | Hasegawa .............. H04N 1/407 |
| 2017/0061899 A1* | 3/2017 | Nagashima .......... G09G 3/3406 |
| 2019/0088193 A1 | 3/2019 | Tada et al. |

FOREIGN PATENT DOCUMENTS

JP 2016-173477 A 9/2016

* cited by examiner

*Primary Examiner* — Tapas Mazumder
(74) *Attorney, Agent, or Firm* — Venable LLP

(57) ABSTRACT

A control apparatus for controlling a display module, the control apparatus includes: at least one memory and at least one processor which function as: acquiring information which is added to input image data and relates to at least one of a maximum brightness of an input image represented by the input image data and an upper limit brightness being an upper limit value of a dynamic range of the input image, and controlling the display module so as to display a setting image for setting a target range to be displayed on the display module among the dynamic range of the input image data, wherein the setting image includes an index indicating a brightness determined based on the information.

16 Claims, 10 Drawing Sheets

FIG. 11
| CHANGE OF MAXIMUM BRIGHTNESS OF INPUT IMAGE | GREAT | SMALL |
|---|---|---|
| SELECTED BRIGHTNESS INFORMATION 413 | MONITOR BRIGHTNESS INFORMATION 412 | MAXIMUM BRIGHTNESS INFORMATION 411 |
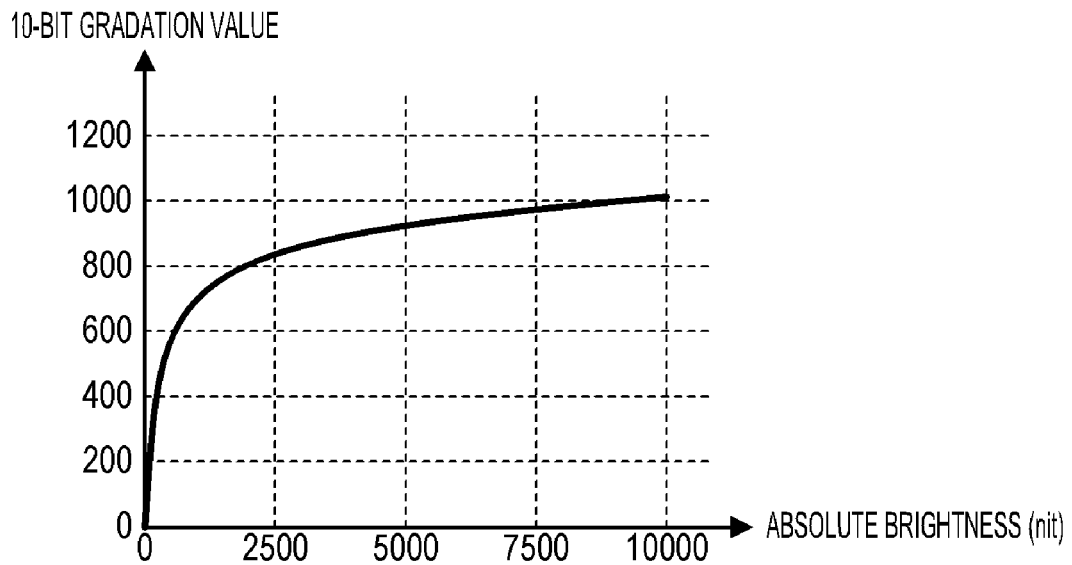
FIG. 12
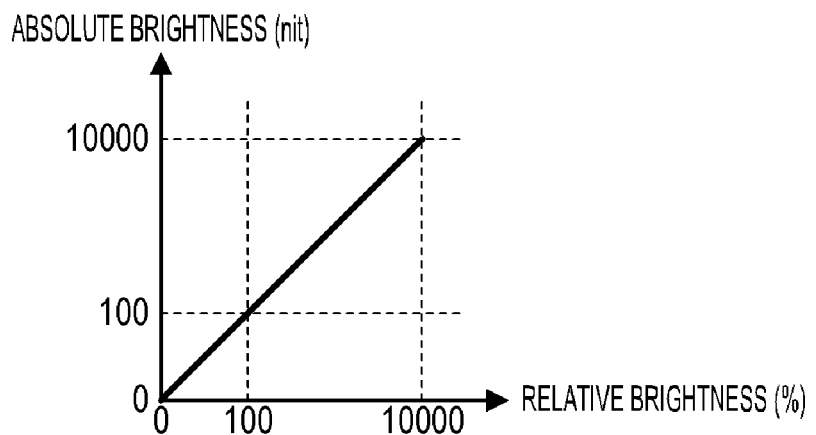
FIG. 13

CONTROL APPARATUS AND CONTROL METHOD

BACKGROUND OF THE INVENTION

Field of the Invention

The present invention relates to a control apparatus which controls display of a graphical user interface image for setting a brightness range serving as a display target, and a control method.

Description of the Related Art

There are increasing opportunities to use image data having a wide dynamic range (brightness range), i.e., what is called HDR (high dynamic range) image data. For example, with an improvement in the light-receiving performance of an imaging apparatus, the number of imaging apparatuses capable of capturing an HDR image (an image having a wide brightness range; an image corresponding to the HDR image data) is increasing.

In the imaging apparatus capable of capturing the HDR image, for example, as the HDR image data, image data in which brightness is converted to a gradation value according to a conversion characteristic close to a Log characteristic is generated and output. In the HDR image data, there are cases where relative brightness is used as the brightness of the HDR image.

An example of the conversion characteristic used at a movie production site includes Cineon Log which is specified based on the characteristic of a film having a wide dynamic range. In Cineon Log, in the case where the relative brightness of reference white (reference relative brightness) is 100%, a brightness range up to a relative brightness of at least 1,000% is used.

The display performance of a display apparatus is also improved, and the number of display apparatuses capable of display with a high contrast of several hundred thousand to one or a high brightness of several thousand candelas is increasing. For example, in a liquid crystal display apparatus, it is possible to implement display with high contrast by using local dimming which uses a backlight module which applies light to a liquid crystal panel. Further, it is also possible to implement display with high brightness by increasing the light emission brightness of the backlight module.

However, there are cases where the dynamic range of the display apparatus (the range of display brightness (brightness on a display surface)) is narrower than the dynamic range of the HDR image data. In such cases, in at least part of the dynamic range of the HDR image data, it is not possible to faithfully display the brightness of the HDR image data (brightness used (supposed to be used) in the HDR image data).

Japanese Patent Application Publication No. 2016-173477 discloses a technique for allocating the display brightness to the brightness of the HDR image data according to the display performance of the display apparatus.

However, in the technique disclosed in Japanese Patent Application Publication No. 2016-173477, there are cases where the display brightness is inefficiently allocated to the brightness range which is not used in the HDR image data depending on user setting (setting of the brightness range serving as a display target), and an entirely dark image is displayed. The reduction in display brightness causes a reduction in the visibility of a dark portion (low-gradation portion) of an image, and hence the reduction in display brightness is not preferable. In particular, in the case where a visual environment is bright, the reduction in visibility becomes conspicuous, and hence the reduction in display brightness should be prevented.

SUMMARY OF THE INVENTION

The present invention in its first aspect provides a control apparatus for controlling a display module, the control apparatus comprising:

at least one memory and at least one processor which function as:

acquiring information which is added to input image data and relates to at least one of a maximum brightness of an input image represented by the input image data and an upper limit brightness being an upper limit value of a dynamic range of the input image, and controlling the display module so as to display a setting image for setting a target range to be displayed on the display module among the dynamic range of the input image data, wherein the setting image includes an index indicating a brightness determined based on the information.

The present invention in its second aspect provides a control method for controlling a display module, the control method comprising:

acquiring information which is added to input image data and relates to at least one of a maximum brightness of an input image represented by the input image data and an upper limit brightness being an upper limit value of a dynamic range of the input image, and controlling the display module so as to display a setting image for setting a target range to be displayed on the display module among the dynamic range of the input image data, wherein the setting image includes an index indicating a brightness determined based on the information.

The present invention in its third aspect provides a non-transitory computer readable medium that stores a program, wherein the program causes a computer to execute a control method for controlling a display module, the control method comprising:

acquiring information which is added to input image data and relates to at least one of a maximum brightness of an input image represented by the input image data and an upper limit brightness being an upper limit value of a dynamic range of the input image, and controlling the display module so as to display a setting image for setting a target range to be displayed on the display module among the dynamic range of the input image data, wherein the setting image includes an index indicating a brightness determined based on the information.

Further features of the present invention will become apparent from the following description of exemplary embodiments with reference to the attached drawings.

BRIEF DESCRIPTION OF THE DRAWINGS

FIG. 11 is a view showing an example of a selection method of brightness information;

FIG. 12 is a view showing an example of the correspondence between the absolute brightness and the gradation value;

FIG. 13 is a view showing an example of the correspondence between the relative brightness and the absolute brightness;

DESCRIPTION OF THE EMBODIMENTS

Problem to be Solved by the Present Invention

Hereinbelow, the problem to be solved by the present invention will be described.

Examples of a transmission standard of image data (image signal) include Rec. 709 and the like. However, in Rec. 709, transmission of image data having a wide dynamic range (brightness range), i.e., what is called HDR (high dynamic range) image data is not specified. In the case where Rec. 709 is used, it is possible to transmit only the image data having a relatively narrow dynamic range. Herein, consideration will be given to the case where the HDR image data is transmitted to a display apparatus according to Rec. 709 in order to display an image based on the HDR image data. In this case, it is necessary to compress the dynamic range of the HDR image data to a dynamic range specified in Rec. 709. Consequently, there are cases where the dynamic range (the dynamic range after the compression) of the image data inputted to the display apparatus is narrower than the dynamic range (the range of display brightness (brightness on a display surface)) of the display apparatus. In addition, in the display apparatus, there are cases where only part of display performance (the dynamic range of the display apparatus) is used to display the image (occurrence of loss of a brightness range). That is, in the case where Rec. 709 is used, there are cases where the image data having a suitable dynamic range cannot be inputted to the display apparatus.

To cope with this, as the transmission standard of the HDR image data, there is proposed SMPTE ST 2084 standard (ST2084 standard) or the like. In the case where the ST2084 standard is used, as shown in FIG. 12, absolute brightnesses of the HDR image data (absolute brightnesses used (supposed to be used) in the HDR image data) ranging from 0 to 10,000 nits are converted to 10-bit gradation values from 0 to 1,023 according to a Log characteristic.

In the HDR image data, there are cases where relative brightness is used instead of the absolute brightness as the brightness of an HDR image (an image having a wide dynamic range; an image corresponding to the HDR image data). FIG. 13 shows an example of a method of conversion from the relative brightness to the absolute brightness. In FIG. 13, 100% corresponding to the relative brightness of reference white (reference relative brightness) is converted to 100 nits, and 10,000% is converted to 10,000 nits according to a linear characteristic in which the absolute brightness is proportional to the relative brightness.

A brightness range up to 10,000 nits is defined in the ST2084 standard, but few display apparatuses can display the brightness range up to 10,000 nits. Consequently, there is proposed a technique for allocating the display brightness to the absolute brightness of the HDR image data according to the display performance of the display apparatus.

Figure 14:
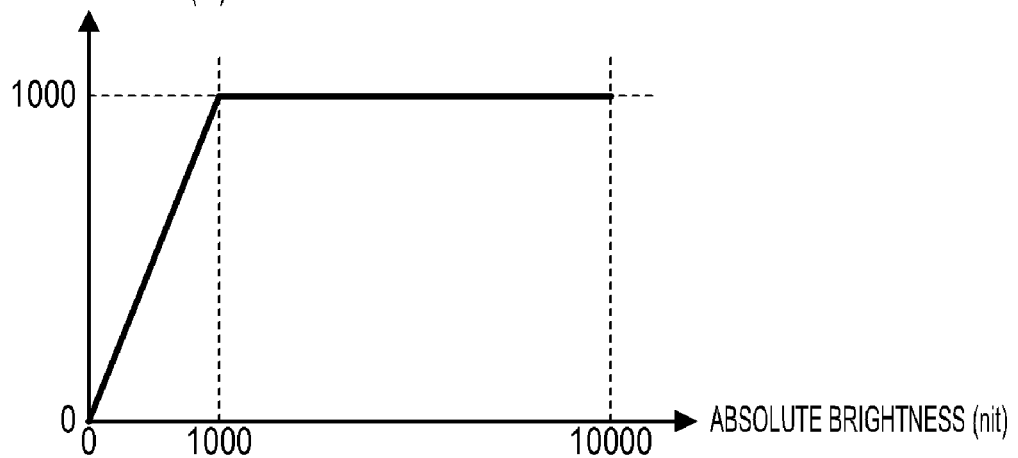
FIG. 14 is a view showing an example of a correspondence between the absolute brightness of image data and the display brightness.
Figure 15:
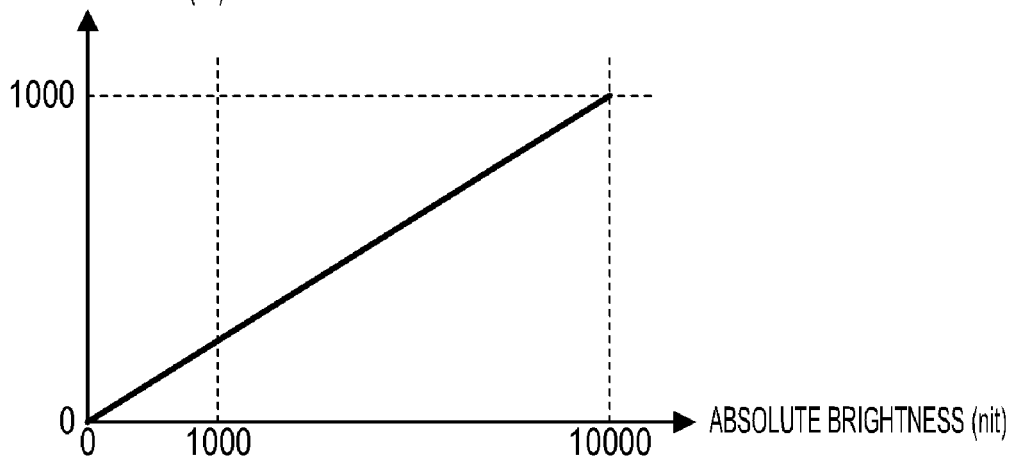
FIG. 15 is a view showing an example of the correspondence between the absolute brightness of the image data and the display brightness.

FIGS. 14 and 15 show examples of a method for allocating the display brightness to the absolute brightness of the HDR image data. Each of FIGS. 14 and 15 shows an example of the case where the dynamic range of the display apparatus is a brightness range of 0 to 1,000 nits.

In FIG. 14, to the absolute brightness of not more than 1,000 nits, the display brightness equal to the absolute brightness is allocated. To the absolute brightness higher than 1,000 nits, the display brightness of 1,000 nits is allocated (clipping). That is, the brightness range of 0 to 1,000 nits in the dynamic range of the HDR image data is used as a display target. According to the method in FIG. 14, it is possible to faithfully display, among a plurality of the absolute brightnesses of the HDR image data, the absolute brightness of not more than 1,000 nits.

In FIG. 15, the display brightness is allocated to the absolute brightness such that the display brightness linearly increases from 0 nits to 1,000 nits in response to the increase of the absolute brightness from 0 nits to 10,000 nits. That is, the entire dynamic range (0 to 10,000 nits) of the HDR image data is used as the display target. According to the method in FIG. 15, display with the display brightness lower than the absolute brightness of the HDR image data is performed, and it becomes possible to check all gradations of the HDR image data.

The method for allocating the display brightness to the absolute brightness of the HDR image data, specifically, the brightness range serving as the display target is set in response to a user operation. As described above, in the ST2084 standard, the brightness range up to 10,000 nits is defined. However, depending on the performance of the imaging apparatus which captures the HDR image, user setting (imaging conditions such as ISO sensitivity, an upper limit brightness, and the like), and imaging scenes (an object, imaging time, and the like), the maximum brightness or the upper limit brightness of the HDR image data is sometimes lower than 10,000 nits. In this case, depending on the user setting of the display apparatus (setting of the brightness range serving as the display target), there are cases where the display brightness is inefficiently allocated to the brightness range which is not used in the HDR image data, and an entirely dark image is displayed. The above reduction in display brightness causes a reduction in the visibility of a dark portion (low-gradation portion) of the image, and hence the reduction in display brightness is not preferable.

The upper limit brightness is the upper limit value of the range of the brightness which can be used in the HDR image data. For example, let us assume that the HDR image data is recorded in an image data format compliant with the ST2084 standard. In the HDR image data recorded in the image data format compliant with the ST2084 standard, it is possible to record a signal value such that the brightness up to 10,000 nits can be identified, and there are cases where the upper limit is provided in the brightness range to be recorded by setting of the imaging apparatus or an editing apparatus. The upper limit value of the range of the brightness which can be used in the HDR image data set by the imaging apparatus or the editing apparatus is used as the upper limit brightness.

The upper limit brightness changes correspondingly to imaging conditions of the imaging apparatus. When the ISO sensitivity set in the imaging apparatus falls within a specific range, as the ISO sensitivity increases, the upper limit value of the brightness which can be recorded in the image data increases. For example, in the case where the ISO sensitivity set in the imaging apparatus is 100, the upper limit value of the brightness which can be recorded (upper limit brightness) is 160 nits. In the case where the ISO sensitivity set in the imaging apparatus is at least 800, the upper limit brightness is 1,600 nits. Accordingly, information indicating the ISO sensitivity of the imaging apparatus when the HDR image data is acquired, which is added to the HDR image data output from the imaging apparatus, is information indicating the upper limit brightness.

In addition, the maximum value of the brightness recorded in the HDR image data is used as the maximum brightness. Among values of brightnesses of a plurality of pixels included in the HDR image data recorded in the image data format compliant with the ST2084 standard, the maximum value is the maximum brightness.

In other words, the upper limit brightness can be the upper limit value of the brightness which can be included in the HDR image data, and the maximum brightness can be the maximum value of the brightness included in the HDR image data. That is, in the HDR image data recorded in the image data format compliant with the ST2084 standard, a pixel corresponding to the dynamic range compliant with the ST2084 standard exists, but a pixel corresponding to the dynamic range equal to or higher than the upper limit brightness does not exist.

Figure 16:
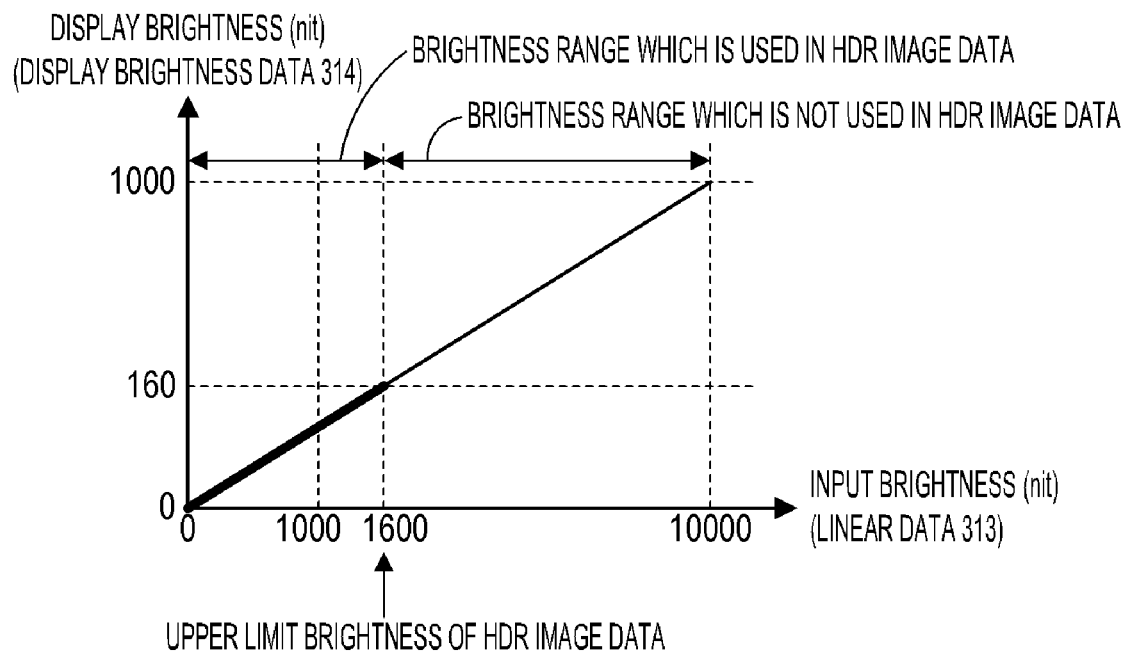
FIG. 16 is a view showing an example of the correspondence between the absolute brightness of the image data and the display brightness.

Herein, let us assume that the upper limit brightness of the HDR image data is 1600 nits. In addition, let us assume that a user specifies the brightness range of the ST2084 standard (0 to 10,000 nits) as the display target without noticing that the upper limit brightness of the HDR image data is 1,600 nits. In this case, as shown in FIG. 16, a display brightness of 160 nits is allocated to the upper limit brightness of the HDR image data which is 1,600 nits, and an entirely dark image is displayed. In order to efficiently allocate the display brightness to the brightness range (0 to 1,600 nits) used in the HDR image data to display an entirely bright image, it is preferable to set the brightness range of 0 to 1,600 nits as the display target. In this case, an upper limit display brightness of 1,000 nits is allocated to the upper limit brightness of the HDR image data which is 1,600 nits.

In embodiments described below, execution of an operation for setting the brightness range serving as the display target such that the image is displayed with a suitable brightness is facilitated. Specifically, the execution of an operation for setting the brightness range used in the HDR image data as the display target is facilitated. The brightness range used in the HDR image data is the brightness range up to the upper limit brightness or the maximum brightness of the HDR image.

Embodiment 1

Hereinbelow, a description will be given of a control apparatus and a control method according to Embodiment 1 of the present invention. In the control apparatus and the control method according to the present embodiment, display of a GUI image (graphical user interface image) for setting the brightness range serving as the display target is controlled. In the following description, a description will be given of an example in which the control apparatus according to the present embodiment is a display apparatus. Note that the control apparatus according to the present embodiment may be an apparatus (e.g., a personal computer) separate from the display apparatus.

Figure 1:
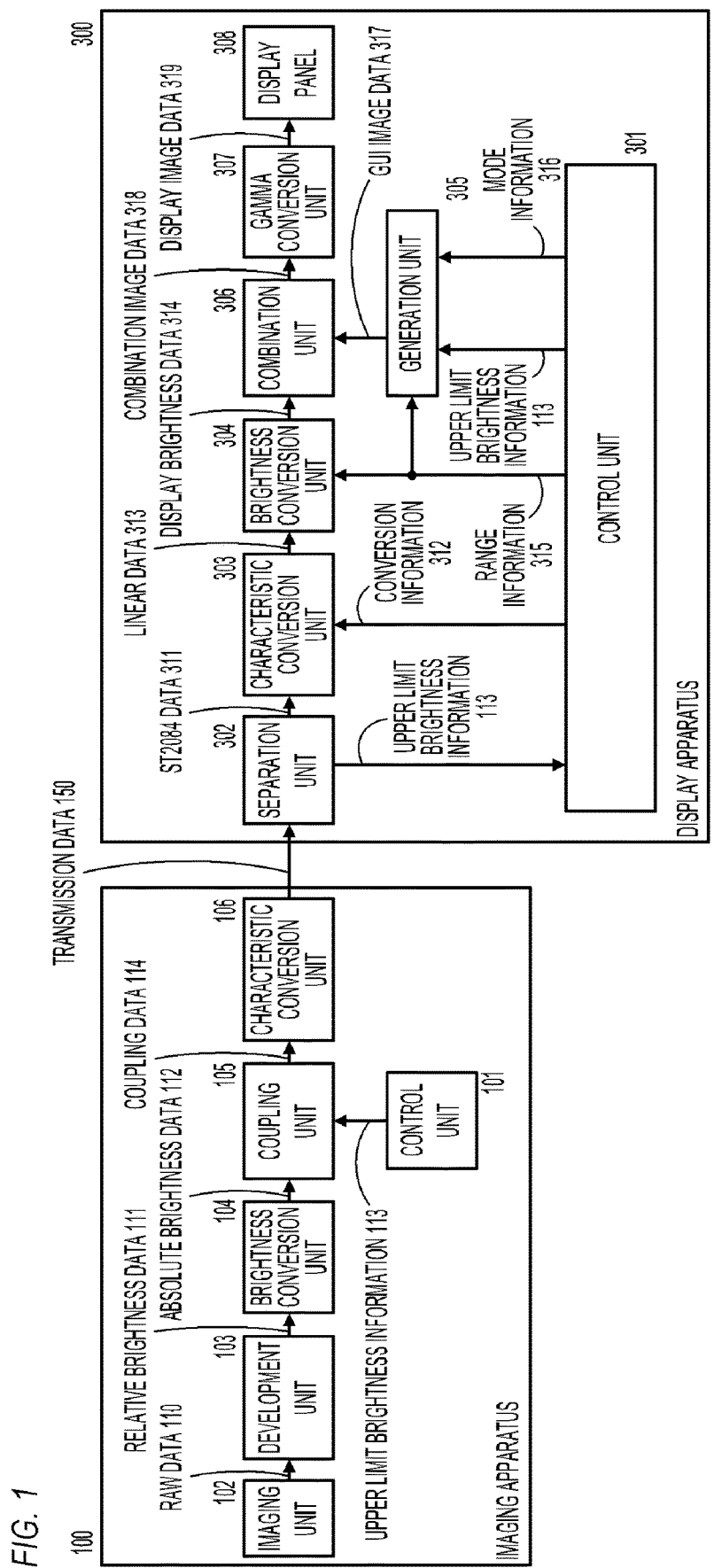
FIG. 1 is a block diagram showing an example of the configuration of a display system.

FIG. 1 is a block diagram showing an example of the configuration of a display system according to the present embodiment. As shown in FIG. 1, the display system according to the present embodiment has an imaging apparatus 100 and a display apparatus 300. The imaging apparatus 100 captures an HDR image, and outputs HDR image data representing the HDR image to the display apparatus 300. The display apparatus 300 displays an image based on input image data (the HDR image data output from the imaging apparatus 100), and various GUI images on a display surface. Note that the input image data of the display apparatus 300 does not need to be the HDR image data. The input image data of the display apparatus 300 may be still image data or video data.

The configuration of the imaging apparatus 100 will be described. The imaging apparatus 100 has a control unit 101, an imaging unit 102, a development unit 103, a brightness conversion unit 104, a coupling unit 105, and a characteristic conversion unit 106.

The control unit 101 controls the individual blocks of the imaging apparatus 100. For example, the control unit 101 sets parameters used in the individual blocks of the imaging apparatus 100. The set parameters may be parameters which are predetermined by a manufacturer or the like, may be parameters which are automatically determined in the imaging apparatus 100, or may also be parameters which are specified by the user. The set parameters may be parameters which can be changed automatically or manually. When the imaging apparatus 100 is activated, the control unit 101 reads and sets parameters (predetermined initial parameters or previously set parameters) stored in a non-volatile memory (not shown) of the imaging apparatus 100.

The imaging unit 102 performs imaging to generate RAW data 110 (image data representing an object image (image)). Specifically, the imaging unit 102 has a lens and an image sensor (e.g., a CMOS sensor), the lens applies object light (light from an object) to the image sensor, and the image sensor converts the object light emitted from the lens to an electrical signal (RAW data 110). In the present embodiment, the RAW data 110 is RGB data having a linear characteristic (a characteristic in which the gradation value is proportional to the brightness), and the gradation value of the RAW data 110 is a 16-bit value. The imaging unit 102 outputs the RAW data 110 to the development unit 103.

The development unit 103 performs a development process on the RAW data 110 output from the imaging unit 102 to generate relative brightness data 111. The relative brightness data 111 is image data in which the gradation value corresponds to the relative brightness (%) and, specifically, the relative brightness data 111 is image data in which the gradation value is defined by the relative brightness. As a method of conversion from the RAW data 110 to the relative brightness data 111, it is possible to use various proposed methods. In the present embodiment, the relative brightness data 111 is RGB data having a linear characteristic (a characteristic in which the gradation value is proportional to the relative brightness), and the gradation value of the relative brightness data 111 is the 16-bit value. Further, in the present embodiment, the brightness range of 0 to 1,600% is used in the relative brightness data 111. The brightness range used in the relative brightness data 111 may be a brightness range which is predetermined by the manufacturer or the like, may be a brightness range which is automatically determined in the imaging apparatus 100, or may also be a brightness range which is specified by the user. For example, the brightness range used in the relative brightness data 111 may be determined according to imaging conditions such as the ISO sensitivity. The brightness range used in the relative brightness data 111 may be a brightness range which can be changed automatically or manually. The development unit 103 outputs the relative brightness data 111 to the brightness conversion unit 104.

Figure 2:
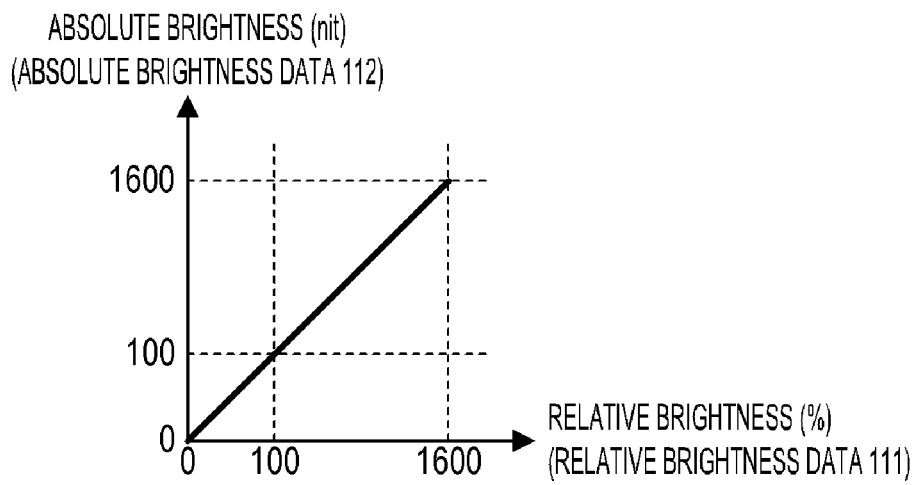
FIG. 2 is a view showing an example of a correspondence between a relative brightness and an absolute brightness.

The brightness conversion unit 104 performs conversion from the relative brightness (%) to the absolute brightness (nit) to convert the relative brightness data 111 output from the development unit 103 to absolute brightness data 112. The absolute brightness data 112 is image data in which the gradation value corresponds to the absolute brightness and, specifically, the absolute brightness data 112 is image data in which the gradation value is defined by the absolute brightness (nit). FIG. 2 shows an example of a method of conversion from the relative brightness (%) to the absolute brightness (nit). In FIG. 2, 100% corresponding to the relative brightness of reference white (reference relative brightness) is converted to 100 nits, and 1,600% is converted to 1,600 nits according to the linear characteristic in which the absolute brightness is proportional to the relative brightness. Note that the relative brightness of reference white does not need to be 100%, and the relative brightness may be converted to the absolute brightness according to a nonlinear characteristic in which the absolute brightness is not proportional to the relative brightness. The brightness conversion unit 104 outputs the absolute brightness data 112 to the coupling unit 105.

The coupling unit 105 couples upper limit brightness information 113 set from the control unit 101 and the absolute brightness data 112 output from the brightness conversion unit 104 to generate coupling data 114. The coupling may be performed for each frame, and may also be performed for every several frames. The upper limit brightness information 113 is information indicating the upper limit brightness of the absolute brightness data, and can be generated according to the brightness range used in the relative brightness data 111 (the range of the relative brightness). As described above, in the present embodiment, the brightness range used in the relative brightness data 111 is the brightness range of 0 to 1,600%. Accordingly, the upper limit brightness information 113 indicates the absolute brightness of 1,600 nits which corresponds to the relative brightness of 1,600%. Note that, instead of the upper limit brightness information 113, other information relating to the upper limit brightness or the maximum brightness of the absolute brightness data 112 may be used. For example, information indicating the maximum brightness of the absolute brightness data 112, and information indicating imaging conditions (the ISO sensitivity and the like) corresponding to the absolute brightness data 112 may also be used. The coupling unit 105 outputs the coupling data 114 to the characteristic conversion unit 106.

Figure 3:
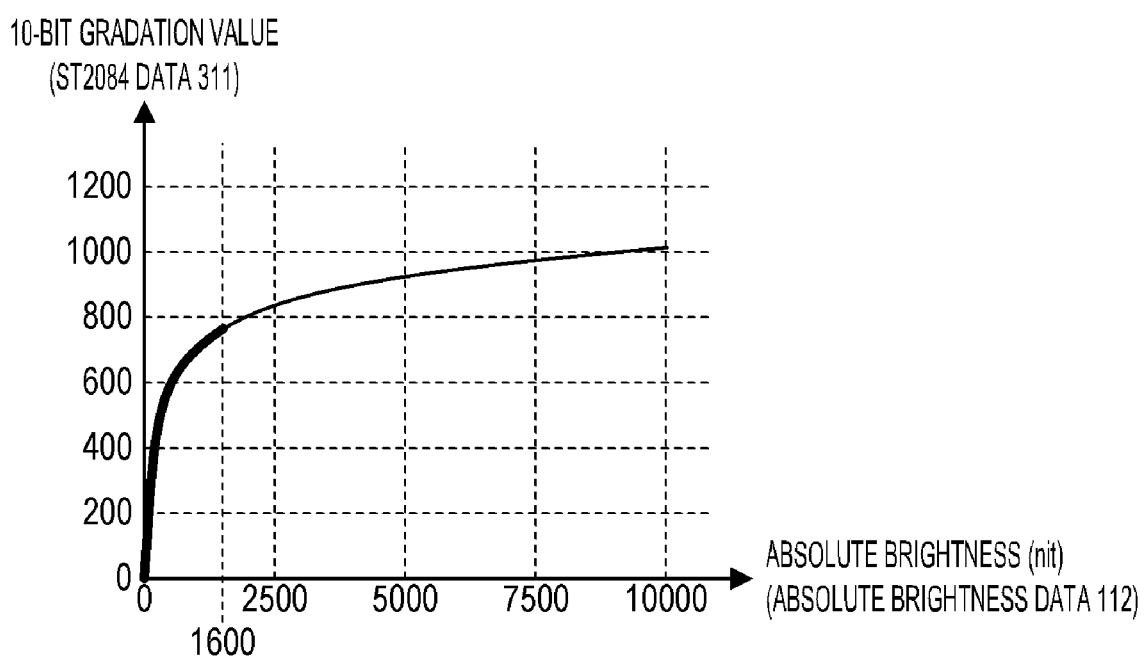
FIG. 3 is a view showing an example of a correspondence between the absolute brightness and a gradation value.

The characteristic conversion unit 106 converts a gradation characteristic of the absolute brightness data 112 included in the coupling data 114 according to the ST2084 standard serving as the transmission standard of the HDR image data. With this, the absolute brightness data 112 is converted to ST2084 data 311. Specifically, the gradation characteristic of the absolute brightness data 112 is converted according to a conversion characteristic shown in FIG. 3. The conversion characteristic in FIG. 3 is a Log characteristic in which 0 to 10,000 nits are converted to the 10-bit gradation values from 0 to 1,023. Further, the characteristic conversion unit 106 converts the format of the coupling data 114 to an SDI (serial digital interface) format. With these processes, the coupling data 114 is converted to transmission data 150 which is SDI data (SDI signal). The upper limit brightness information 113 is stored in an ancillary area of the transmission data 150, and the ST2084 data 311 is stored in an image area of the transmission data 150. The characteristic conversion unit 106 outputs the transmission data 150 to the display apparatus 300 (SDI transmission). Note that the transmission of the image data from the imaging apparatus 100 to the display apparatus 300 is not limited to the SDI transmission, and the transmission thereof may also be HDMI transmission or IP transmission via a LAN. That is, the format of the transmission data 150 is not limited to the SDI format, and may also be an HDMI format or an IP format.

The configuration of the display apparatus 300 will be described. The display apparatus 300 has a control unit 301, a separation unit 302, a characteristic conversion unit 303, a brightness conversion unit 304, a generation unit 305, a combination unit 306, a gamma conversion unit 307, and a display panel 308.

The control unit 301 controls the individual blocks of the display apparatus 300. For example, the control unit 301 sets parameters used in the individual blocks of the display apparatus 300. The set parameters may be parameters which are predetermined by the manufacturer or the like, may be parameters which are automatically set in the display apparatus 300, or may also be parameters which are specified by the user. The set parameters may be parameters which can be changed automatically or manually. When the display apparatus 300 is activated, the control unit 301 reads and sets parameters (predetermined initial parameters or previously set parameters) stored in a non-volatile memory (not shown) of the display apparatus 300.

The separation unit 302 separates the transmission data 150 output from the imaging apparatus 100 into the ST2084 data 311 (the input image data of the display apparatus 300) and the upper limit brightness information 113 (additional information added to the input image data). Specifically, the separation unit 302 extracts (acquires) the ST2084 data 311 from the image area of the transmission data 150, and extracts (acquires) the upper limit brightness information 113 from the ancillary area of the transmission data 150. As described above, the upper limit brightness information 113 is the information indicating the upper limit brightness of the input image (the image represented by the input image data; the HDR image) and, instead of the upper limit brightness information 113, other information relating to the upper limit brightness or the maximum brightness of the input image may be used. For example, information indicating the maximum brightness of the input image, and information indicating imaging conditions (the ISO sensitivity and the like) corresponding to the input image may also be used. The separation unit 302 outputs the upper limit brightness information 113 to the control unit 301, and outputs the ST2084 data 311 to the characteristic conversion unit 303.

Figure 4:
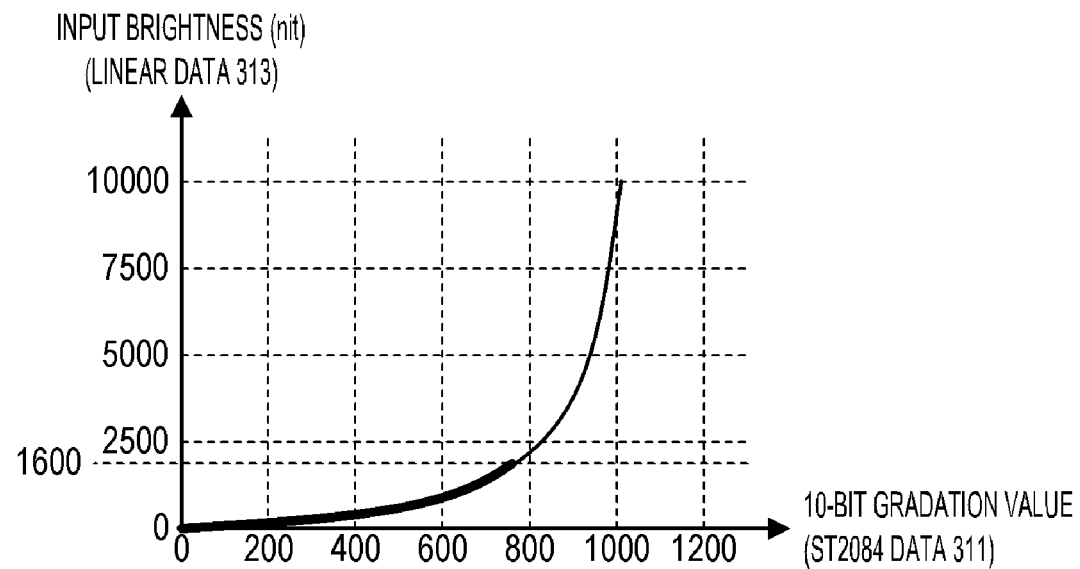
FIG. 4 is a view showing an example of a correspondence between the gradation value and an input brightness.

The characteristic conversion unit 303 convers the gradation characteristic of the ST2084 data 311 based on conversion information 312 (information indicating the conversion characteristic for converting the gradation characteristic) set from the control unit 301. In the present embodiment, the ST2084 data 311 having the Log characteristic (the characteristic in which the gradation value changes logarithmically with respect to the brightness) is converted to linear data 313 having the linear characteristic (the characteristic in which the gradation value is proportional to the brightness) according to a conversion characteristic shown in FIG. 4. The conversion characteristic in FIG. 4 is a characteristic in which the 10-bit gradation values from 0 to 1023 are converted to the absolute brightnesses (input brightnesses) from 0 to 10,000 nits, and is an inverse characteristic of the conversion characteristic in FIG. 3. In the present embodiment, the linear data 313 is image data in which the gradation value corresponds to the absolute brightness (nit) and, specifically, the linear data 313 is image data in which the gradation value is defined by the absolute brightness. The gradation value of the linear data 313 is the 16-bit value. The characteristic conversion unit 303 outputs the linear data 313 to the brightness conversion unit 304.

Figure 5:
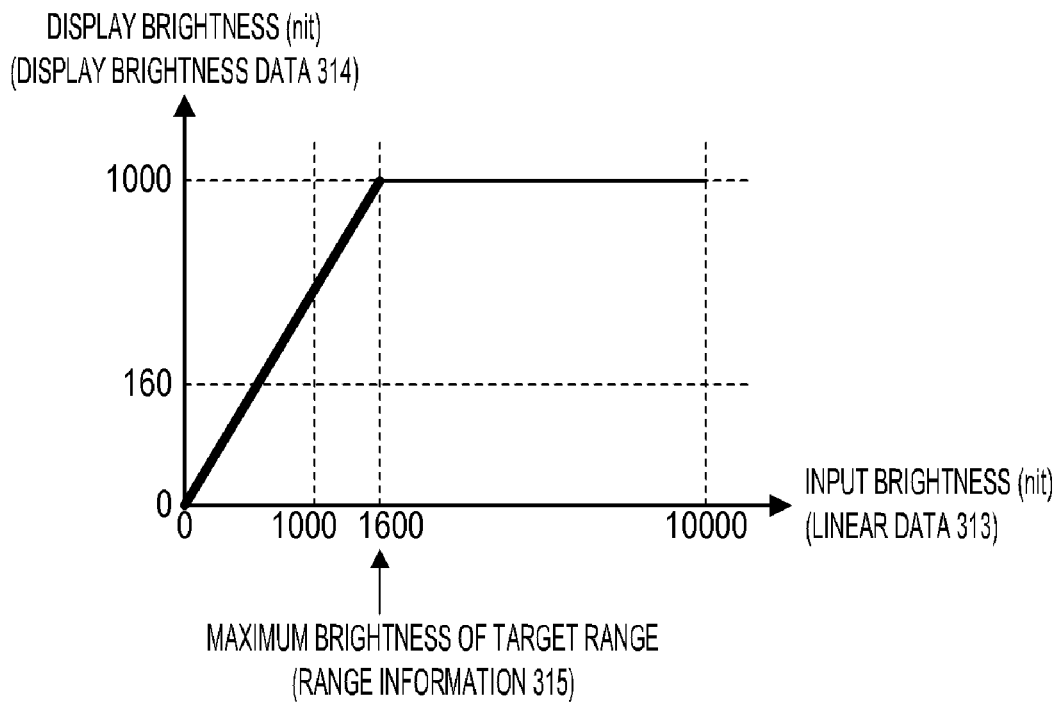
FIG. 5 is a view showing an example of a correspondence between the input brightness and a display brightness.

The brightness conversion unit 304 performs conversion from the input brightness (nit) which is the absolute brightness of the input image (the linear data 313) to the display brightness (nit) based on range information 315 set from the control unit 301 to convert the linear data 313 to display brightness data 314. The range information 315 is information indicating a target range (the brightness range serving as the display target) and, specifically, the range information 315 is information indicating the maximum brightness of the target range. The target range, specifically, the maximum brightness of the target range is specified by the user. The display brightness data 314 is image data in which the gradation value corresponds to the display brightness and, specifically, the display brightness data 314 is image data in which the gradation value is defined by the display brightness (nit). FIG. 5 shows an example of a method of conversion from the input brightness (nit) to the display brightness (nit). In FIG. 5, the input brightness equal to the maximum brightness of the target range is converted to the upper limit display brightness according to a linear characteristic in which the input brightness is proportional to the absolute brightness. Subsequently, the input brightness higher than the maximum brightness of the target range is limited to the input brightness equal to the maximum brightness of the target range, and is converted to the upper limit display brightness. FIG. 5 shows an example in which the maximum brightness of the target range is 1,600 nits, and the upper limit display brightness is 1,000 nits. Accordingly, the input brightness of at least 1,600 nits is converted to the upper limit display brightness of 1,000 nits. The brightness conversion unit 304 outputs the display brightness data 314 to the combination unit 306.

The generation unit 305 can generate various pieces of GUI image data representing GUI images (graphical user interface images). In the present embodiment, the generation unit 305 generates GUI image data 317 representing the GUI image for setting the target range, and outputs the GUI image data 317 to the combination unit 306. Specifically, the generation unit 305 generates the GUI image data 317 representing the GUI image in which the brightness (the upper limit brightness of the input image) indicated by the upper limit brightness information 113 can be identified based on the upper limit brightness information 113 (additional information). Note that, in the GUI image represented by the GUI image data 317, it is only required that the brightness based on the additional information (the additional information relating to the upper limit brightness or the maximum brightness of the input image) can be identified, and the brightness different from the upper limit brightness of the input image may be able to be identified.

The combination unit 306 combines the GUI image data 317 output from the generation unit 305 with the display brightness data 314 output from the brightness conversion unit 304. With this, combination image data 318 representing a combination image in which an image (target image) represented by the display brightness data 314 and the GUI image represented by the GUI image data 317 are arranged is generated. The arrangement of the target image and the GUI image may be an arrangement which is predetermined by the manufacturer or the like, may be an arrangement which is automatically determined in the display apparatus 300, or may also be an arrangement which is specified by the user. The set arrangement may be an arrangement which can be changed automatically or manually. In the present embodiment, the combination image data 318 is generated such that the target image is displayed on the entire display surface and the GUI image is displayed so as to overlap part of the target image. The combination unit 306 outputs the combination image data 318 to the gamma conversion unit 307.

The gamma conversion unit 307 performs gamma conversion on the combination image data (the image data having the linear characteristic) output from the combination unit 306 to generate display image data 319 which meets a gamma characteristic of the display panel 308 (a display device of the display panel 308). The gamma characteristic of the display panel 308 is dependent on the type of the display device of the display panel 308. The gamma conversion unit 307 outputs the display image data 319 to the display panel 308.

The display panel 308 displays an image based on the display image data 319 output from the gamma conversion unit 307 on the display surface. The display panel 308 is, e.g., a liquid crystal panel having a plurality of liquid crystal devices or an organic EL panel having a plurality of organic EL devices. In the case where a display panel which allows passage of light to display an image (the liquid crystal panel or the like) is used, a light source (a backlight module or the like) which applies light to the display panel is required. A plurality of display devices (a plurality of liquid crystal devices or a plurality of organic EL devices) are arranged, e.g., in a matrix.

A specific example of the process (the generation of the GUI image data 317) of the generation unit 305 will be described. Herein, let us assume that the upper limit brightness of the input image is 1,600 nits.

Figure 6:
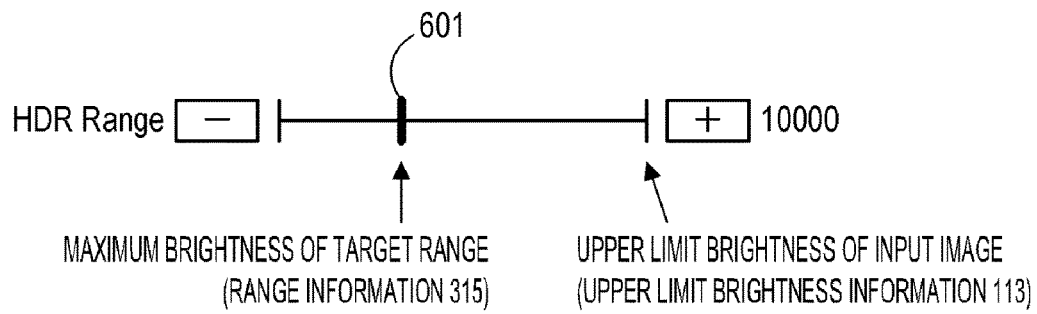
FIG. 6 is a view showing an example of a GUI image.

In the present embodiment, the generation unit 305 generates the GUI image data 317 which represents a scroll bar shown in FIG. 6. The scroll bar in FIG. 6 is configured to be able to specify and change the maximum brightness of the target range. Specifically, in the scroll bar in FIG. 6, an item 601 indicating the maximum brightness of the target range is depicted at a position where the maximum brightness of the target range is indicated. The maximum brightness of the target range is the brightness specified by the user, and can be determined from the range information 315. The range information 315 (the maximum brightness of the target range) is changed in response to an operation for changing the position of the item 601.

Specifically, the generation unit 305 generates the GUI image data 317 according to the range information 315 set from the control unit 301, the upper limit brightness information 113, and mode information 316. The mode information 316 is information indicating the mode (form) of the GUI image data 317. The generation unit 305 generates the GUI image data 317 in the mode indicated by the mode information 316. The mode of the GUI image data 317 may be a mode which is predetermined by the manufacturer or the like, may be a mode which is automatically determined in the display apparatus 300, or may also be a mode which is specified by the user. The set mode may be a mode which can be changed automatically or manually.

Figure 7A:
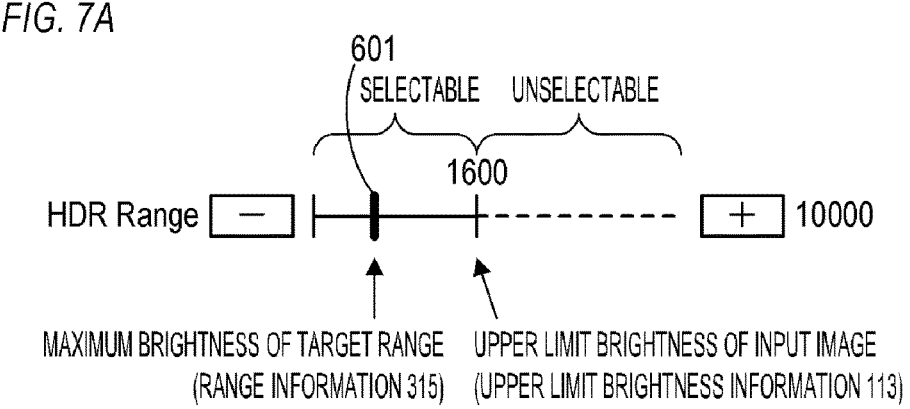
FIGS. 7A to 7C are views showing examples of the GUI image.

In the case of a mode 1, the generation unit 305 generates the GUI image data 317 which represents a scroll bar shown in FIG. 7A. The scroll bar in FIG. 7A indicates a specific brightness range up to the brightness higher than the upper limit brightness of the input image (the brightness based on the additional information relating to the upper limit brightness or the maximum brightness of the input image). Specifically, the entire length of the scroll bar corresponds to the brightness range of the ST2084 standard (0 to 10,000 nits).

In the scroll bar in FIG. 7A, the brightness range lower than 1,600 nits serving as the upper limit brightness of the input image is displayed such that each brightness in the brightness range can be selected as the maximum brightness of the target range. On the other hand, the brightness range higher than 1,600 nits serving as the upper limit brightness of the input image is displayed such that each brightness in the brightness range cannot be selected as the maximum brightness of the target range. The upper limit brightness of the input image which is 1,600 nits is determined from the upper limit brightness information 113 which is the additional information generated in the imaging apparatus 100. Note that the upper limit brightness of the input image is preferably selectable as the maximum brightness of the target range, but may also be non-selectable as the maximum brightness of the target range.

Thus, in the case of the mode 1, the user cannot select (specify) the brightness higher than the upper limit brightness of the input image as the maximum brightness of the target range. With this, it is possible to prevent the display brightness from being inefficiently allocated to the brightness range which is not used in the input image and prevent an unnecessarily dark image from being displayed.

Figure 7B:
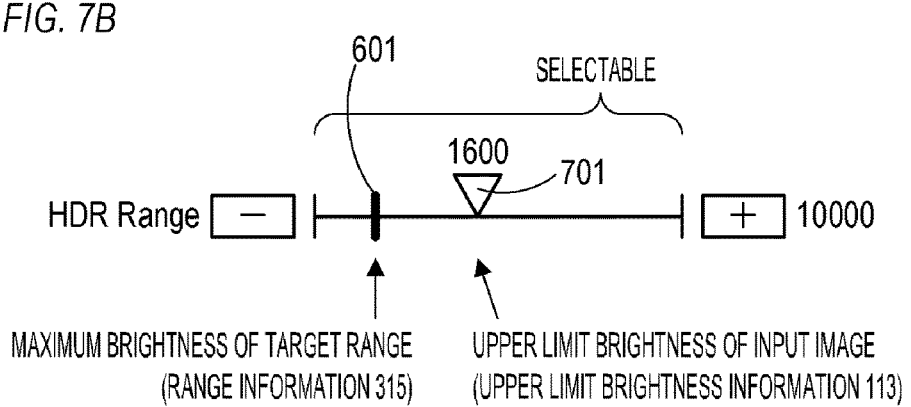

In the case of a mode 2, the generation unit 305 generates the GUI image data 317 which represents a scroll bar shown in FIG. 7B. Similarly to FIG. 7A, the entire length of the scroll bar in FIG. 7B corresponds to the brightness range of the ST2084 standard (0 to 10,000 nits).

In the scroll bar in FIG. 7B, the brightness range of the ST2084 standard is displayed such that each brightness in the brightness range can be selected as the maximum brightness of the target range. With this, the user can select the brightness which cannot be selected in the mode 1 as the maximum brightness of the target range.

Further, in the scroll bar in FIG. 7B, an item 701 is depicted at a position where the upper limit brightness of the input image is indicated. With this, the user can easily grasp the upper limit brightness of the input image with the item 701, and easily select a suitable brightness as the maximum brightness of the target range.

Figure 7C:
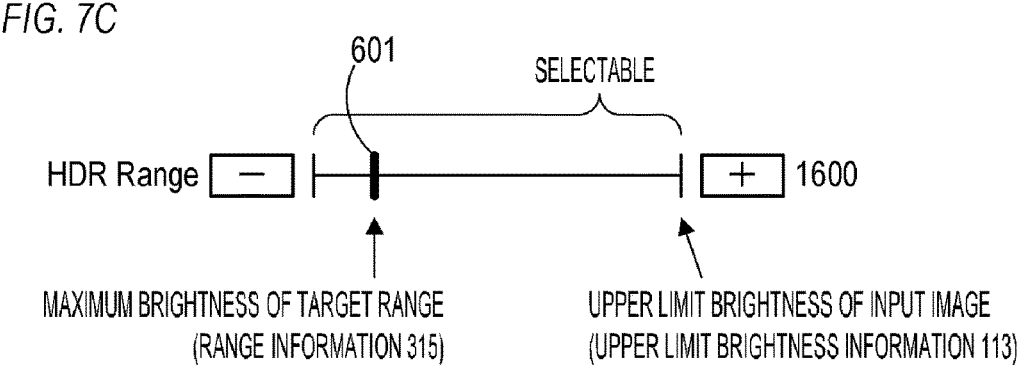

In the case of a mode 3, the generation unit 305 generates the GUI image data 317 which represents a scroll bar shown in FIG. 7C. Unlike FIGS. 7A and 7B, the scroll bar in FIG. 7C indicates a specific brightness range up to the upper limit brightness of the input image. Specifically, the entire length of the scroll bar in FIG. 7C corresponds to the brightness range of the input image (0 to 1,600 nits). With this, the length of the scroll bar corresponding to the brightness range of the input image is longer than those in FIGS. 7A and 7B, and the user can easily select a desired brightness in the brightness range of the input image as the maximum brightness of the target range. Further, the user can select the maximum brightness of the target range such that the maximum brightness of the target range is finely adjusted in the brightness range of the input image.

Note that the GUI image for setting the target range is not limited to the scroll bar. Other modes for displaying a GUI image different from the scroll bar may further be used. Examples of the other modes include the following modes 4 and 5 for displaying a list in which a plurality of predetermined brightnesses are indicated as candidates for the maximum brightness of the target range. Hereinafter, the candidate for the maximum brightness of the target range is described as a "candidate brightness".

Figure 8A:
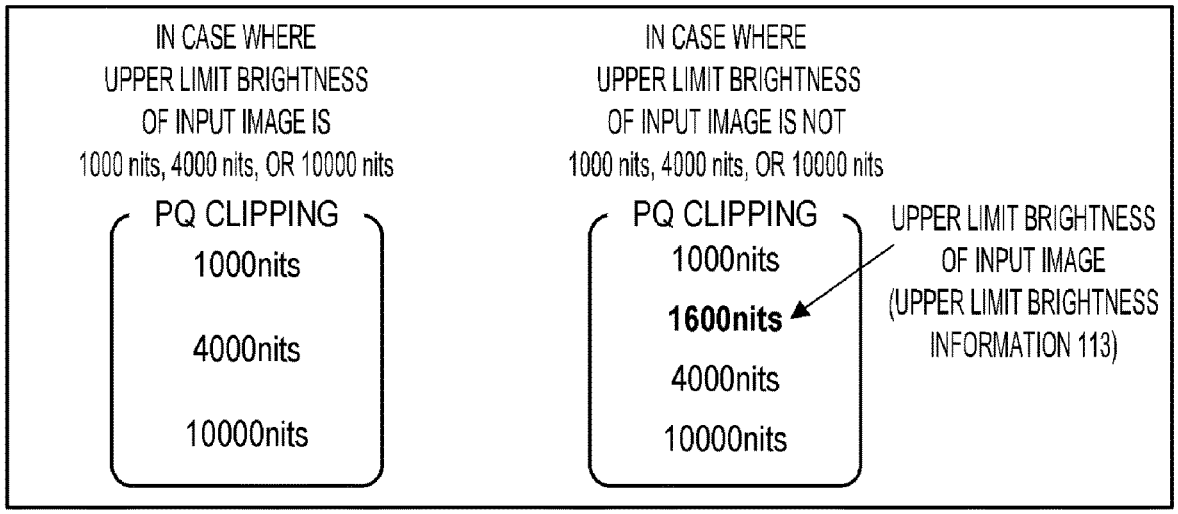
FIGS. 8A and 8B are views showing examples of the GUI image.

In the case of the mode 4, the generation unit 305 generates the GUI image data 317 which represents a list shown in FIG. 8A. In FIG. 8A, a plurality of predetermined candidate brightnesses are 1,000 nits, 4,000 nits, and 10,000 nits.

Specifically, in the case where the plurality of predetermined candidate brightnesses (1,000 nits, 4,000 nits, and 10,000 nits) include the upper limit brightness of the input image, the generation unit 305 generates the list (on the left side of FIG. 8A) which indicates the plurality of predetermined candidate brightnesses. In the case where the plurality of predetermined candidate brightnesses do not include the upper limit brightness of the input image, the generation unit 305 generates the list (on the right side of FIG. 8A) which indicates the plurality of predetermined candidate brightnesses and the upper limit brightness of the input image. With this, it becomes possible to set the upper limit brightness of the input image as the target range. In addition, in the list, the upper limit brightness of the input image is highlighted and displayed. For example, a character string indicating the upper limit brightness of the input image is shown in boldface, and character strings indicating other candidate brightnesses are shown in lightface. With this, the user can easily grasp the upper limit brightness of the input image, and easily select the upper limit brightness of the input image as the maximum brightness of the target range.

Figure 8B:
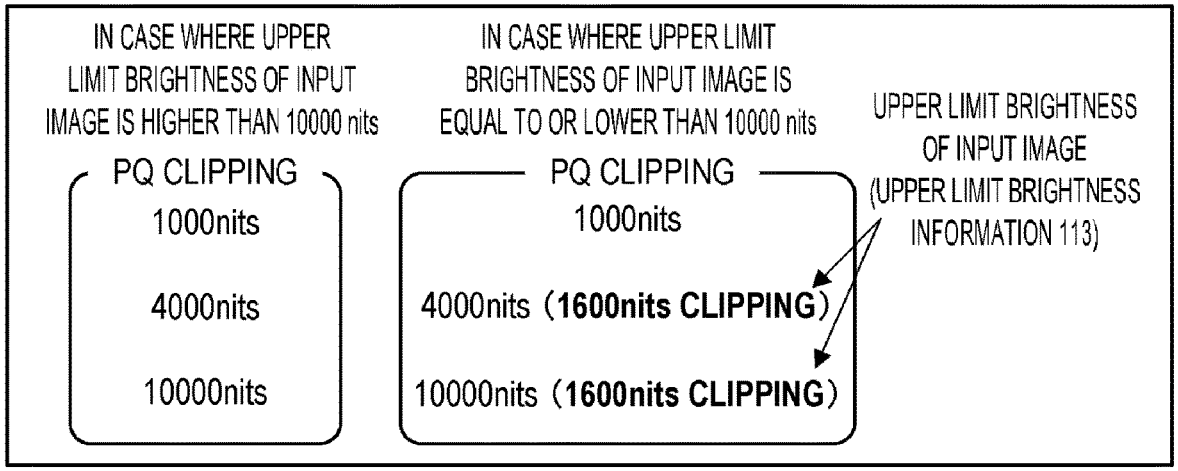

In the case of the mode 5, the generation unit 305 generates the GUI image data 317 which represents a list shown in FIG. 8B. Specifically, irrespective of whether or not a plurality of predetermined candidate brightnesses (1,000 nits, 4,000 nits, and 10,000 nits) include the upper limit brightness of the input image, the generation unit 305 generates the list which indicates the plurality of predetermined candidate brightnesses. In the list, the upper limit brightness of the input image is indicated so as to be associated with, among the plurality of predetermined candidate brightnesses, the candidate brightness higher than the upper limit brightness of the input image (on the right side of FIG. 8B). In the case where all of the plurality of predetermined candidate brightnesses are not more than the upper limit brightness of the input image, the upper limit brightness of the input image is not indicated in the list (on the left side of FIG. 8B). With this, the user can easily grasp the upper limit brightness of the input image, and easily select the brightness of the input image as the maximum brightness of the target range.

Herein, in the case where the candidate brightness higher than the upper limit brightness of the input image is selected, the selected candidate brightness may or may not be set as the maximum brightness of the target range. For example, in the case where the candidate brightness higher than the upper limit brightness of the input image is selected, the upper limit brightness of the input image may be set as the maximum brightness of the target range. In addition, in the list, the upper limit brightness of the input image may be indicated such that execution of clipping in which the brightness higher than the upper limit brightness of the input image is limited to the upper limit brightness of the input image is indicated. The right side of FIG. 8B shows an example in the case where the upper limit brightness of the input image is 1,600 nits. The right side of FIG. 8B indicates the execution of the clipping in the case where the candidate brightness of 4,000 nits or the candidate brightness of 10,000 nits is selected. With this, the user can easily grasp whether or not the clipping is executed.

As described thus far, according to the present embodiment, the additional information relating to the upper limit brightness or the maximum brightness of the input image is acquired, and the GUI image in which the brightness based on the additional information can be identified is displayed as the GUI image for setting the brightness range serving as the display target. With this, the execution of the operation for setting the brightness range serving as the display target such that the image is displayed with the suitable brightness is facilitated.

Figure 9:
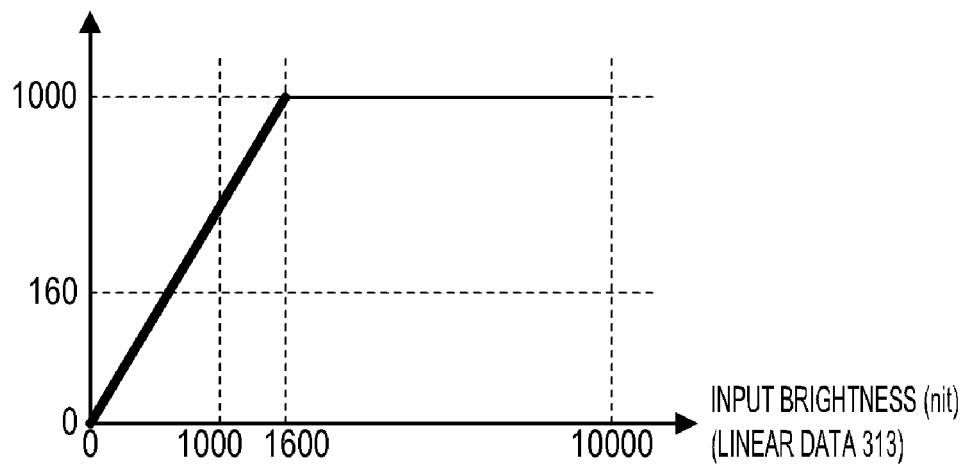
FIG. 9 is a view showing an example of the correspondence between the input brightness and the display brightness.
Figure 9:
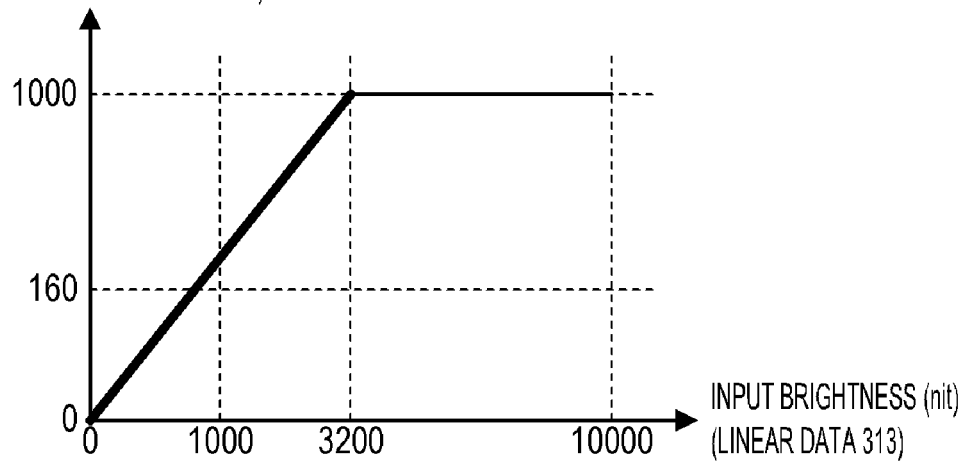

Note that, in the case where the upper limit brightness of the input image is set as the maximum brightness of the target range, the maximum brightness of the target range may be automatically changed according to the change of the upper limit brightness of the input image such that the upper limit brightness of the input image is continuously set as the maximum brightness of the target range. A specific example will be described by using FIG. 9. As shown in the upper graph in FIG. 9, let us assume that the upper limit brightness of the input image is 1,600 nits, and 1,600 nits is set as the maximum brightness of the target range. The above setting is performed, e.g., in the case where it is desired to check gradations up to the upper limit brightness of the input image. As shown in the lower graph in FIG. 9, when the upper limit brightness of the input image changes to 3,200 nits, the maximum brightness of the target range is automatically updated to 3,200 nits. With this, it is possible to continuously set the upper limit brightness of the input image as the maximum brightness of the target range without executing a complicated operation in which the maximum brightness of the target range is newly specified every time the upper limit brightness of the input image changes.

Embodiment 2

Hereinbelow, a description will be given of a control apparatus and a control method according to Embodiment 2 of the present invention. In Embodiment 1, the example of the display apparatus connected to the imaging apparatus has been described. In Embodiment 2, an example of a display apparatus connected to an editing apparatus will be described. Note that, hereinbelow, points (configurations, processes, and the like) different from those in Embodiment 1 will be described in detail, and the description of points identical to those in Embodiment 1 will be omitted.

Figure 10:
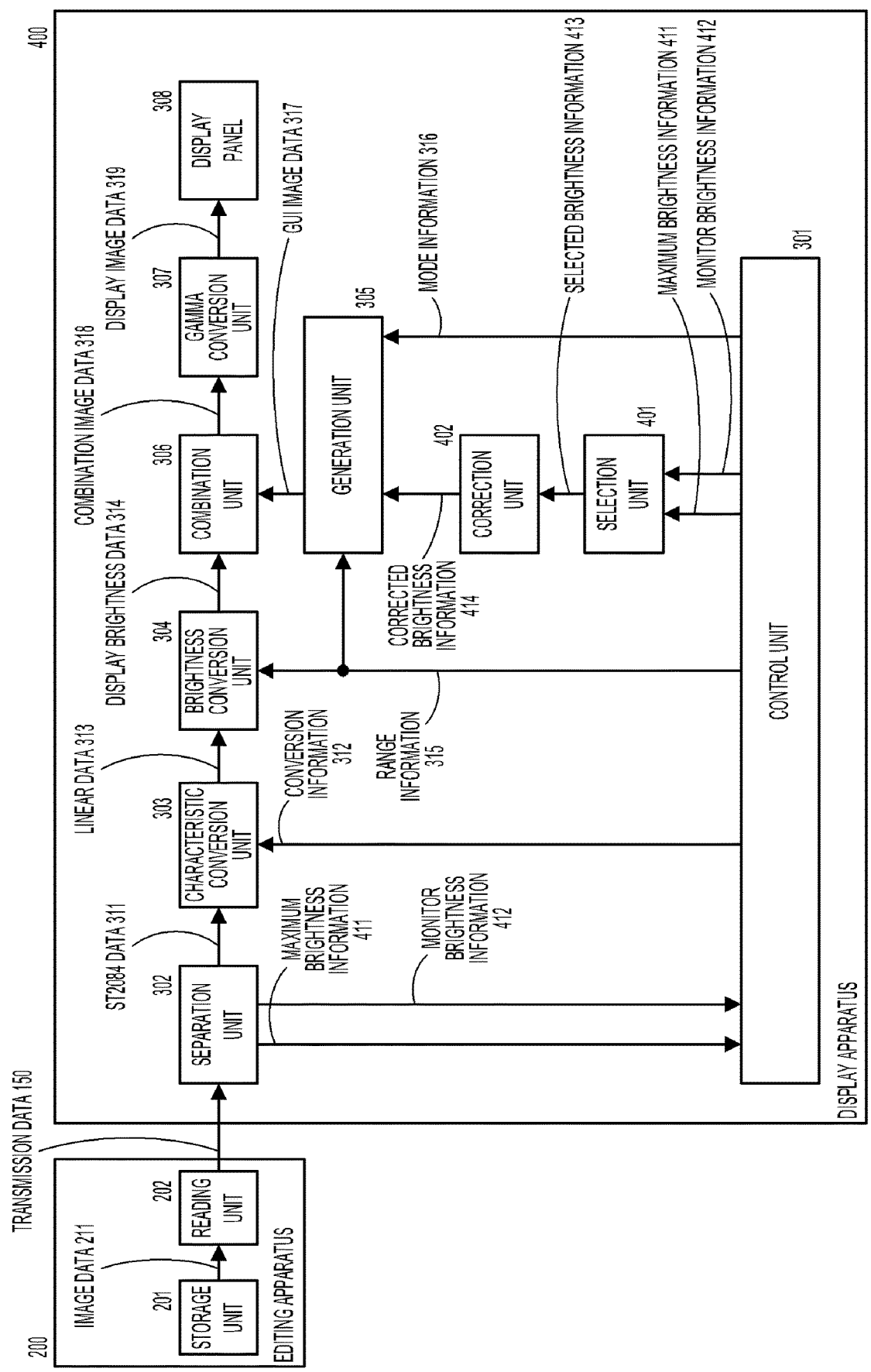
FIG. 10 is a block diagram showing an example of the configuration of a display system.

FIG. 10 is a block diagram showing an example of the configuration of a display system according to the present embodiment. In FIG. 10, the same blocks as those in FIG. 1 (Embodiment 1) are designated by the same reference numerals. As shown in FIG. 10, the display system according to the present embodiment has an editing apparatus 200 and a display apparatus 400.

The configuration of the editing apparatus 200 will be described. The editing apparatus 200 has a storage unit 201 and a reading unit 202.

The storage unit 201 stores image data. The storage unit 201 is, e.g., a hard disk drive, a solid state drive, or the like. In the present embodiment, image data stored in the storage unit 201 is HDR image data converted according to the conversion characteristic of the ST2084 standard (FIG. 3), and additional information is added to the HDR image data stored in the storage unit 201. In the present embodiment, the additional information is information specified by ST 2094 standard, and indicates the maximum brightness of the HDR image data and the upper limit display brightness of a reference monitor used in previous editing of the HDR image data. The additional information indicates the maximum brightness of each scene or the maximum brightness of entire content as the maximum brightness of the HDR image data. In the present embodiment, the additional information is added for each frame.

Note that the storage unit 201 may be a storage apparatus which is attachable to and detachable from the editing apparatus 200. The editing apparatus 200 may be a reproduction apparatus, and the storage unit 201 may be a Blu-ray disk, a DVD disk, or the like.

The reading unit 202 selects and reads image data 211 stored in the storage unit 201 in response to an instruction from the user, and outputs the image data 211 to the display apparatus 400 as the transmission data 150. In the case where the image data 211 is video data, the user can issue an instruction for starting and ending the read. In the present embodiment, let us assume that the video data is read and output to the display apparatus 400.

The configuration of the display apparatus 400 will be described. The display apparatus 400 has the control unit 301, the separation unit 302, the characteristic conversion unit 303, the brightness conversion unit 304, the generation unit 305, the combination unit 306, the gamma conversion unit 307, the display panel 308, a selection unit 401, and a correction unit 402.

Similarly to Embodiment 1, the separation unit 302 separates the transmission data 150 into the ST2084 data 311 (the input image data of the display apparatus 400) and the additional information added to the input image data. In the present embodiment, as the additional information, maximum brightness information 411 indicating the maximum brightness of each scene or the maximum brightness of the entire content, and monitor brightness information 412 indicating the upper limit display brightness (monitor brightness) of the reference monitor used in the previous editing of the input image are acquired. One monitor brightness is determined for each editing project usually, and the monitor brightness does not change from one frame to another.

The selection unit 401 selects the maximum brightness information 411 or the monitor brightness information 412 according to the magnitude of change of the maximum brightness of the input image caused by switching of the input image (frame), and outputs the selected information to the correction unit 402 as selected brightness information 413. "The magnitude of change of the maximum brightness of the input image caused by switching of the input image (frame)" can be "the magnitude of a difference in the maximum brightness of the input image between frames". The maximum brightness of the input image is determined from the maximum brightness information 411. In the present embodiment, as shown in FIG. 11, the maximum brightness information 411 or the monitor brightness information 412 is selected.

Herein, consideration will be given to the case where the maximum brightness information 411 is used instead of the upper limit brightness information 113 in Embodiment 1. In the case where the change of the maximum brightness of the input image is greater than a threshold value, the state of the GUI image (the brightness range (selection range) indicated by the scroll bar, positions of items indicating various brightnesses, and the like) for setting the target range greatly changes, and it is difficult to execute an operation for setting the target range. On the other hand, in the case where the change of the maximum brightness of the input image is less than the threshold value, the great change of the state of the GUI image does not occur, and the operation for setting the target range (a user operation for setting the target range) does not become difficult to execute.

Consequently, in the case where the change of the maximum brightness of the input image is greater than the threshold value, the selection unit 401 selects the monitor brightness information 412 such that the GUI image is generated by using the monitor brightness information 412 without using the maximum brightness information 411. With this, although it is not possible to change the state of the GUI image so as to follow the change of the scene, it is possible to prevent the great change of the state of the GUI image. On the other hand, in the case where the change of the maximum brightness of the input image is less than the threshold value, the selection unit 401 selects the maximum brightness information 411 such that the GUI image is generated by using the maximum brightness information 411 without using the monitor brightness information 412. With this, it is possible to change the state of the GUI image so as to follow the change of the scene without causing the great change of the state of the GUI image.

In Embodiment 1, the upper limit brightness of the input image has been used as the brightness based on the additional information. The correction unit 402 determines the brightness based on the additional information by using the selected brightness information 413. In the present embodiment, the correction unit 402 corrects the selected brightness information 413 (selected brightness; the maximum brightness of the input image or the upper limit display brightness of the reference monitor) such that the change of the brightness based on the additional information is reduced, and determines corrected brightness information 414 (the brightness based on the additional information). For example, the correction unit 402 filters the selected brightness information 413 in a time direction to generate the corrected brightness information 414. Specifically, information indicating an average brightness of the brightness indicated by the selected brightness information 413 of the current frame and the brightness indicated by the selected brightness information 413 or the corrected brightness information 414 of the immediately previous frame is determined to be the corrected brightness information 414 of the current frame by the correction unit 402. In the generation unit 305, the corrected brightness information 414 is used instead of the upper limit brightness information 113 in Embodiment 1. By reducing the change of the corrected brightness information 414, it is possible to further reduce the change of the state of the GUI image for setting the target range.

As described thus far, also in the present embodiment, the additional information relating to the upper limit brightness or the maximum brightness of the input image is acquired, and the GUI image in which the brightness based on the additional information can be identified is displayed as the GUI image for setting the brightness range serving as the display target. With this, the execution of the operation for setting the brightness range serving as the display target such that the image is displayed with the suitable brightness is facilitated.

Further, according to the present embodiment, the maximum brightness of the input image or the upper limit display brightness of the reference monitor is selected and used according to the magnitude of change of the maximum brightness of the input image. With this, it is possible to suitably reduce the change of the state of the GUI image for setting the target range, and prevent the user operation for setting the target range from becoming difficult to execute.

Note that the individual blocks in Embodiments 1 and 2 (FIGS. 1 and 10) may or may not be individual pieces of hardware. Functions of at least two blocks may be implemented by common hardware. A plurality of functions of one block may be individually implemented by pieces of hardware. At least two functions of one block may be implemented by common hardware. In addition, each block may or may not be implemented by hardware. For example, an apparatus may have a processor and a memory in which a control program is stored. Functions of at least part of blocks of the apparatus may be implemented by the processor which reads the control program from the memory and executes the control program.

Note that Embodiments 1 and 2 (including modifications described above) are only illustrative, and a configuration obtained by appropriately modifying or changing the configurations of Embodiments 1 and 2 within the scope of the gist of the present invention is also included in the present invention. A configuration obtained by appropriately combining the configurations of Embodiments 1 and 2 is also included in the present invention. For example, various numbers of bits, various characteristics, various brightness ranges, and various formats described in Embodiments 1 and 2 are only illustrative, and are not particularly limited.

According to the present disclosure, the execution of the operation for setting the brightness range serving as the display target such that the image is displayed with the suitable brightness is facilitated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-016809, filed on Feb. 1, 2019, which is hereby incorporated by reference herein in its entirety.

What is claimed is:

1. A control apparatus for controlling a display module, the control apparatus comprising:
   at least one memory and at least one processor which function as:
   acquiring information which is added to input image data and relates to at least one of a maximum brightness of an input image represented by the input image data and an upper limit brightness being an upper limit value of a dynamic range of the input image, and
   controlling the display module so as to display a setting image for setting a target range to be displayed on the display module among the dynamic range of the input image data, wherein the setting image includes an index indicating a brightness determined based on the information.

2. The control apparatus according to claim 1, wherein the information indicates the upper limit brightness of the input image, and
   the index indicates the upper limit brightness of the input image.

3. The control apparatus according to claim 1, wherein the information indicates the maximum brightness of the input image and an upper limit display brightness of a monitor used in editing of the input image.

4. The control apparatus according to claim 3, wherein the input image data represents a plurality of input images which are temporally continuous, and
   the at least one memory and at least one processor further function as:
   selecting the maximum brightness of the input image or the upper limit display brightness of the monitor according to a magnitude of change of the maximum brightness of the input image caused by switching of the input image, and determining the brightness based on the information by using the selected brightness.

5. The control apparatus according to claim 4, wherein the at least one memory and at least one processor further function as:
   selecting the upper limit display brightness of the monitor in a case where the change of the maximum brightness of the input image is greater than a threshold value, and
   selecting the maximum brightness of the input image in a case where the change of the maximum brightness of the input image is less than the threshold value.

6. The control apparatus according to claim 4, wherein the at least one memory and at least one processor further function as:
   correcting the selected brightness such that change of the brightness based on the information is reduced and determining the brightness based on the information.

7. The control apparatus according to claim 1, wherein the at least one memory and at least one processor further function as:
   controlling the display module so as to display the setting image which indicates a specific brightness range up to a brightness higher than the brightness based on the information, wherein,
   in the setting image,
   a first brightness range that is lower than the brightness based on the information is indicated such that each brightness in the first brightness range be selectable as a maximum brightness of the target range, and
   a second brightness range that is higher than the brightness based on the information is indicated such that each brightness in the second brightness range be unselectable as the maximum brightness of the target range.

8. The control apparatus according to claim 7, wherein the setting image includes a scroll bar that indicates the specific brightness range.

9. The control apparatus according to claim 1, wherein the at least one memory and at least one processor further function as:
   controlling the display module so as to display the setting image which indicates a specific brightness range up to a brightness higher than the brightness based on the information, wherein
   in the setting image,
   the specific brightness range is indicated such that each brightness in the specific brightness range be selectable as a maximum brightness of the target range, and
   an item is depicted at a position where the brightness based on the information is indicated.

10. The control apparatus according to claim 1, wherein the at least one memory and at least one processor further function as:
    controlling the display module so as to display the setting image which indicates a specific brightness range up to the brightness based on the information.

11. The control apparatus according to claim 1, wherein the at least one memory and at least one processor further function as:
    controlling the display module so as to display the setting image which indicates a plurality of predetermined brightnesses, in a case where the plurality of predetermined brightnesses include the brightness based on the information, and
    controlling the display module so as to display the setting image which indicates the plurality of predetermined brightnesses and the brightness based on the information in a case where the plurality of predetermined brightnesses do not include the brightness based on the information.

12. The control apparatus according to claim 1, wherein the setting image includes a plurality of indexes that indicates a plurality of predetermined brightnesses, wherein,
    in the setting image, the brightness based on the information is indicated so as to be associated with, among the plurality of predetermined brightnesses, a brightness higher than the brightness based on the information.

13. The control apparatus according to claim 12, wherein the setting image indicates that brightnesses higher than the brightness based on the information is limited to the brightness based on the information.

14. The control apparatus according to claim 1, wherein the at least one memory and at least one processor further function as:

setting the brightness based on the information as a maximum brightness of the target range according to change of the brightness based on the information in a case where the brightness based on the information is set as the maximum brightness of the target range.

15. A control method for controlling a display module, the control method comprising:

acquiring information which is added to input image data and relates to at least one of a maximum brightness of an input image represented by the input image data and an upper limit brightness being an upper limit value of a dynamic range of the input image, and controlling the display module so as to display a setting image for setting a target range to be displayed on the display module among the dynamic range of the input image data, wherein the setting image includes an index indicating a brightness determined based on the information.

16. A non-transitory computer readable medium that stores a program, wherein the program causes a computer to execute a control method for controlling a display module, the control method comprising:

acquiring information which is added to input image data and relates to at least one of a maximum brightness of an input image represented by the input image data and an upper limit brightness being an upper limit value of a dynamic range of the input image, and controlling the display module so as to display a setting image for setting a target range to be displayed on the display module among the dynamic range of the input image data, wherein the setting image includes an index indicating a brightness determined based on the information.

* * * * *